United States Patent [19]

Uno et al.

[11] 3,847,765

[45] Nov. 12, 1974

[54] METHOD FOR THE TREATMENT OF CYANIDE-CONTAINING WASTES

[75] Inventors: Taiko Uno; Kohei Uosaki, both of Ibaraki-ken, Japan

[73] Assignee: Mitsubishi Petrochemical Company Limited, Tokyo, Japan

[22] Filed: Dec. 4, 1973

[21] Appl. No.: 421,637

[30] Foreign Application Priority Data

Dec. 20, 1972 Japan...........................47-127245
Dec. 20, 1972 Japan...........................47-127246

[52] U.S. Cl.............................. 204/151, 204/180 P
[51] Int. Cl......................... C02c 5/12, B01d 13/02
[58] Field of Search................. 204/151, 180 P, 130

[56] References Cited
UNITED STATES PATENTS

| | | | |
|---|---|---|---|
| 2,520,703 | 8/1950 | Wagner.......................... | 204/149 X |
| 2,737,298 | 3/1956 | Hendel............................... | 204/149 |
| 3,457,152 | 7/1969 | Maloney, Jr. et al................ | 204/131 |
| 3,645,867 | 2/1972 | Ericson et al....................... | 204/130 |
| 3,719,570 | 3/1973 | Lancy................................. | 204/151 |
| 3,756,932 | 9/1973 | Zievers et al....................... | 204/149 |
| 3,764,497 | 10/1973 | Tarjanyi et al..................... | 204/149 |
| 3,682,796 | 8/1972 | Bedi et al............................ | 204/97 |

Primary Examiner—John H. Mack
Assistant Examiner—A. C. Prescott
Attorney, Agent, or Firm—Wenderoth, Lind & Ponack

[57] ABSTRACT

This invention relates to a method for the treatment of cyanide-containing wastes, which method comprises passing a part of cyanide-containing waste from a cyanide-containing waste storage tank in series through a cathode compartment composed of a cathode and cation exchange membrane and an anode compartment composed of an anode and anion exchange membrane and then recirculating to the cyanide-containing waste storage tank, simultaneously passing the other part of cyanide-containing waste in parallel through a plurality of concentration compartments partitioned by a plurality of anion exchange membranes and cation exchange membranes arranged alternately and then recirculating to the cyanide-containing waste storage tank, and simultaneously passing a solution of an alkali metal chloride or alkaline earth metal chloride from an alkali metal chloride or alkaline earth metal chloride solution storage tank in parallel through a plurality of dilution compartments partitioned by a plurality of anion exchange membranes and cation exchange membranes arranged alternately and then recirculating to the alkali metal chloride or alkaline earth metal chloride solution storage tank.

7 Claims, 2 Drawing Figures

METHOD FOR THE TREATMENT OF CYANIDE-CONTAINING WASTES

BRIEF SUMMARY OF THE INVENTION

This invention relates to a method for the treatment of cyanide-containing wastes and more particularly, it is concerned with a method of treating a cyanide-containing liquid waste by the combination of electrolysis and electrodialysis. For the treatment of cyanide-containingg wastes, various methods have hitherto been proposed, for example, the alkali-chlorine method, biochemical treatment method, electrolytic oxidation method and ozone oxidation method. A suitable treatment method should be selected depending on the form and concentration of a cyanide compound contained in a waste, and on the quantity of the waste and, in general, the alkali-chlorine method and electrolytic oxidation method are employed.

In the alkali-chlorine method, a cyanide-containing waste is made alkaline and exposed to chlorine gas bubbled to decompose the cyanide into nitrogen and carbon dioxide as summarized in the following equations:

$CN^- + Cl_2 \rightarrow CNCl + Cl^-$ (1)
$CNCl + 2NaOH \rightarrow NaCNO + NaCl + H_2O$ (2)
$2NaCNO + 4NaOH + 3Cl_2 \rightarrow 2CO_2 + 6NaCl + N_2 + 2H_2O$ (3)

By this alkali-chlorine method, however, complex salts of silver, nickel, gold, iron and cobalt as cyanide complexes are hard or impossible to decompose. Most of the cyanide compounds contained in the ordinary liquid waste form complexes and, accordingly, are not suitable for the treatment by the alkali-chlorine method.

In the treatment according to the electrolytic oxidation method, a metal is deposited at cathode and cyanide is oxidized and decomposed at anode to form nitrogen and carbon dioxide as shown in the following equations:

$CN^- + 2OH^- \rightarrow CNO^- + H_2O + 2e^-$ (4)
$2CNO^- + 4OH \rightarrow 2CO_2 + N_2 + 2H_2O$ (5)

However, this method can only be adapted for a treatment within a high concentration region, which critical concentration is about 1,000 ppm, because the foregoing complex-forming compound is decomposed to form free cyanide by the cathode reaction but the electric resistance of the solution increases and the current efficiency decreases with the decrease of the cyanide concentration. Furthermore, it has been proposed to lower the critical limit to be treated by adding sodium chloride to a waste, but it is difficult to lower to less than several hundred ppm.

Since the regulation for discharging cyanide-containing wastes has lately been strengthened so as to include even stable cyanide complexes therein, an effective method for removing completely these complexes is desirable.

It is an object of the invention to provide a method for the treatment of cyanide-containing wastes, whereby the above mentioned disadvantages are overcome.

It is another object of the invention to a method of removing completely cyanide compounds in a simple manner using a simple apparatus.

Further objects of the invention will be apparent from the following description.

BRIEF DESCRIPTION OF THE DRAWING

The accompanying drawings are to illustrate the principle of the invention in more detail.

DETAILED DESCRIPTION OF THE INVENTION

Figure 1:
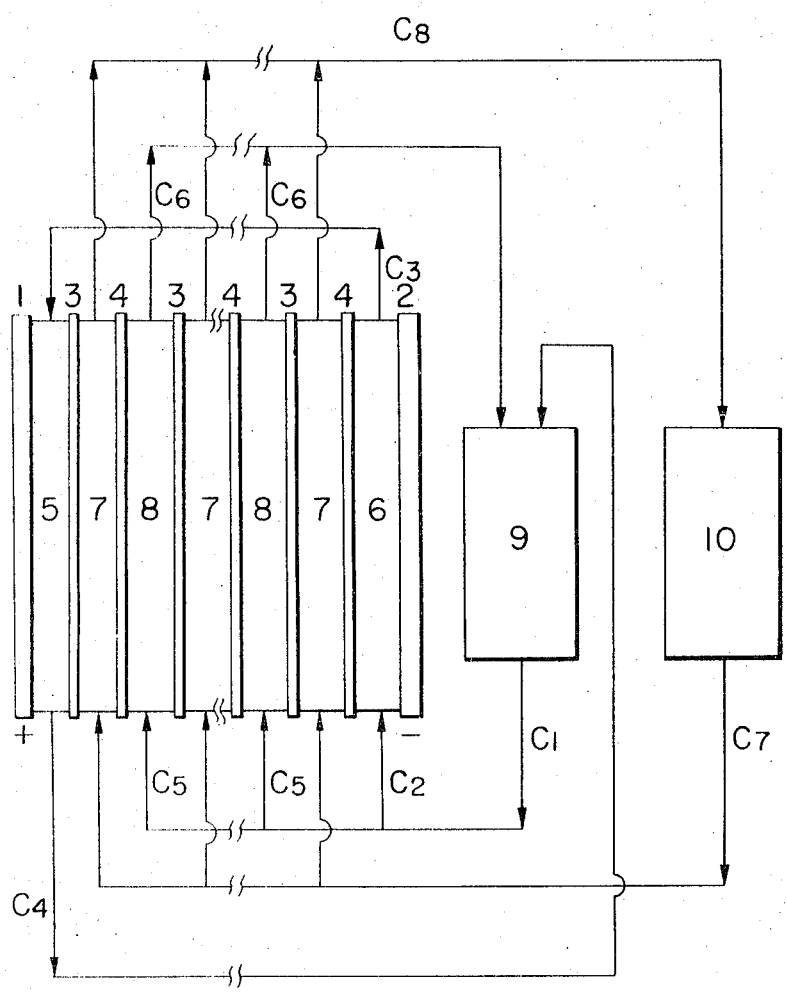
FIG. 1 is a schematic view of a flow diagram including an apparatus for electrodialysis, in which a cyanide-containing waste is treated according to the invention.

In accordance with the present invention, there is provided a method for the treatment of cyanide-containing wastes, which method comprises passing a cyanide-containing waste from a cyanide-containing waste storage tank in series through a cathode compartment composed of a cathode and cation exchange membrane, and an anode compartment composed of an anode and anion exchange membrane and then recirculating to the cyanide-containing waste storage tank, simultaneously passing the other portion of the cyanide-containing waste in parallel through a plurality of concentration compartments partitioned by a plurality of anion exchange membranes and cation exchange membranes arranged alternately and then recirculating to the cyanide-containing waste storage tank, and simultaneously passing a solution of an alkali metal chloride or alkaline earthmetal chloride from an alkali metal chloride or alkaline earth metal chloride solution storage tank in parallel through a plurality of dilution compartments partitioned by a plurality of anion exchange membranes and cation exchange membranes arranged alternately and then recirculating to the alkali metal chloride or alkaline earth metal chloride solution storage tank.

The feature of the method according to the invention consists in a combination of the above mentioned two actions of electrode compartments and electrodialysis. The electrodialysis is carried out by feeding a solution containing a cyanide compound to a concentration compartment and feeding a solution containing an alkali metal chloride or alkaline earth metal chloride to a dilution compartment. In a cathode compartment, the cyanide compound-containing solution is subjected to the action of the cathode and the cyanide compound in a complexed form is dissociated to form free cyanide $(CN^-)$ and, at the same time, it is made alkaline by the alkali metal or alkaline earth metal ion migrated through a cation exchange membrane. The thus resulting solution is then guided to an anode compartment. In the anode compartment, chloride ion $(Cl^-)$ migrated through an anion exchange membrane loses its charge on the surface of the anode to be chlorine gas $(Cl_2)$ which disintegrates the free cyanide in the alkaline solution from the cathode compartment, thus forming harmless carbon dioxide and nitrogen gases.

In accordance with the present invention, therefore, not only simple cyanide compounds such as sodium cyanide and potassium cyanide but also cyanide-containing complexes can completely be decomposed and thus removed.

In the practice of the method according to the invention, one or two electrodialysis units may be used each having a cathode compartment composed of a cathode and cation exchange membrane, anode compartment composed of an anode and anion exchange membrane, and dilution compartments and concentration compartments arranged alternately between the cathode compartment and anode compartment and partitioned by anion exchange membranes and cation exchange membranes. When using one electrodialysis unit, for example, a cyanide-containing liquid waste is fed to the electrodialysis unit from a cyanide-containing waste storage tank in such a manner that a part of the cyanide-containing waste is passed through the cathode compartment and anode compartment in series and then recirculated to the cyanide-containing waste storage tank, while the other part thereof is passed through the concentration compartments in parallel and then recirculated to the cyanide-containing waste storage tank. Simultaneously, a solution containing an alkali metal chloride or alkaline earth metal chloride is fed to the electrodialysis unit from an alkali metal chloride or alkaline earth metal chloride solution storage tank in such a manner that the solution is passed through the dilution compartments in parallel and then circulated to the alkali metal chloride or alkaline earth metal chloride storage tank.

When using two electrodialysis units, a cyanide-containing waste is fed to the electrodialysis units from a cyanide-containing waste storage tank in such a manner that a part of the cyanide-containing waste is passed through the cathode compartment of the first electrodialysis unit and the anode compartment of the second electrodialysis unit in series, and then recirculated to the cyanide-containing waste storage tank, while the other part thereof is passed through the concentration compartments of the first electrodialysis unit in parallel and then through the concentration compartments of the second electrodialysis unit in parallel and, after being combined, it is recirculated to the cyanide-containing waste storage tank. Simultaneously, a solution of an alkali metal chloride or alkaline earth metal chloride from its storage tank is passed in order through the dilution compartments of the first electrodialysis unit in parallel and then through the dilution compartments of the second electrodialysis unit in parallel, and then recirculated to the storage tank. When the concentration of the alkali metal chloride or alkaline earth metal chloride reaches less than a predetermined value, the solution of the alkali metal chloride or alkaline earth metal chloride is discharged from its storage tank and a new cyanide-containing waste is fed thereto. At the same time, the signs of electrodes of each electrodialysis unit are reversed, followed by repeating the operation.

Referring now in detail to the drawing, FIG. 1 shows a preferred embodiment of the apparatus suitable for the practice of the method of the invention. An electrodialysis unit is constructed of an anode 1, cathode 2, anion exchange membrane 3, cation exchange membrane 4, anode compartment 5, cathode compartment 6, dilution compartment 7 and concentration compartment 8, and provided with a cyanide-containing liquid waste storage tank 9 and alkali metal chloride or alkaline earth metal chloride solution storage tank 10. A part of cyanide-containing waste from its storage tank 9 is passed through cathode compartment 6 via lines $C_1$ and $C_2$, passed in series through anode compartment 5 via line $C_3$ and then recirculated to storage tank 9 via line $C_4$, whilst another part of cyanide-containing waste is passed in parallel through concentration compartments 8, 8 via lines $C_1$ and $C_5$, $C_5$ and then recirculated to storage tank 9 via lines $C_6$, $C_6$. Simultaneously, a solution of alkali metal chloride or alkaline earth metal chloride from its storage tank 10 is passed in parallel through dilution compartments 7, 7 via line $C_7$ and then recirculated to storage tank 10 via line $C_8$.

In the above mentioned operation, a material forming a complex in the cyanide-containing waste, for example, potassium ferrocyanide ($K_4[Fe(CN)_6]$) is first subjected to electrolysis to form readily decomposable cyanide ion in cathode compartment 6 as follows:

$$K_4[Fe(CN)_6] \rightarrow (Fe) + 4K^+ + 6CN^- \qquad (6)$$

This solution is then guided to anode compartment 5, where the cyanide ion is decomposed by the electrolytic action and generated chlorine to give nitrogen and carbon dioxide gases. The cyanide concentration in the waste is thus lowered. On the other hand, the alkali metal chloride or alkaline earth metal chloride concentration in the waste is increased while passed through concentration compartment 8. In a case where a small amount of cyanide compound is contained in the solution of alkali metal chloride or alkaline earth metal chloride as mentioned hereinafter, the cyanide compound is also concentrated in the cyanide-containing waste. However, the quantity of this concentration is so less than that of the cyanide compound decomposed and removed in cathode compartment 6 and anode compartment 5 that the cyanide concentration in the cyanide-containing waste is gradually decreased in this circulation system.

While the solution of alkali metal chloride or alkaline earth metal chloride is passed through dilution compartment 7, the alkali metal chloride or alkaline earth metal chloride dissolved therein and, if present, cyanide compound are diluted, so that the alkali metal chloride or alkaline earth metal chloride concentration lowers and the cyanide compound concentration reaches substantially nought.

The cyanide concentration at the concentration side can gradually be lowered by continuing the operation and, at last, the cyanide can completely be removed. In practice, however, the operation is stopped when the concentration of the alkali metal chloride or alkaline earth metal chloride at the dilution side lowers to approximately several hundreds ppm or when, if a cyanide compound is contained at the dilution side, its concentration becomes nought or less than the critical value, and this is followed by the second operation. That is to say, it is desirable to carry out the next oeration after the first operation wherein at the dilution side, the alkali metal chloride or alkaline earth metal chloride concentration lowers to several hundreds ppm or the cyanide concentration lowers to nought or less than the critical value, by discharging the solution of storage tank 10, removing the solution of storage tank 9 containing the alkali metal chloride or alkaline earth metal chloride in a high concentration and cyanide compound in a low concentration even if present into storage tank 10 and supplying a new cyanide-containing waste to be treated to storage tank 9, followed by the subsequent electrodialysis. Thus a cyanide-containing waste can effectively be treated by repeating these operations. A trace of cyanide compound at the concentration side, which remains undecomposed in the first operation, can completely be removed by electrodialysis at the dilution side in the second operation.

Figure 2:
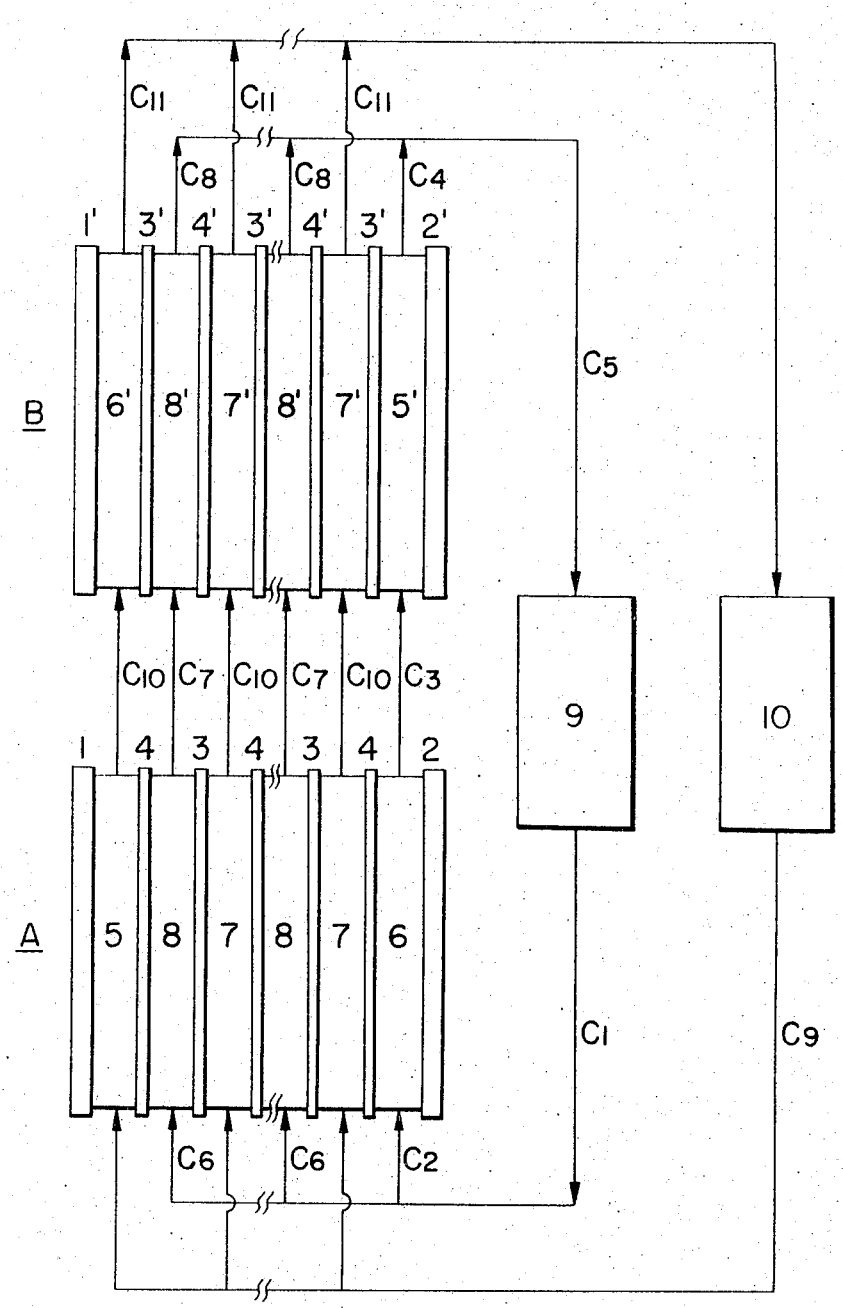
FIG. 2 is another schematic view of a flow diagram including two electrodialysis units, in which a cyanide-containing waste is treated according to the invention.

FIG. 2 shows another preferred embodiment of the apparatus comprising a first electrodialysis unit A and second electrodialysis unit B. In the first step, the first electrodialysis unit A is constructed of an anode 1, cathode 2, anion exchange membrane 3, cation exchange membrane 4, anode compartment 5, cathode compartment 6, dilution compartment 7 and concentration compartment 8, while the second electrodialysis unit B is constructed of a cathode 1', anode 2', anion exchange membrane 3', cation exchange membrane 4', anode compartment 5', cathode compartment 6', dilution compartment 7' and concentration compartment 8'. This system is provided with a cyanide-containing waste storage tank 9 and alkali metal chloride or alkaline earth metal chloride solution storage tank 10. In the operation of this apparatus in the first step, a part of cyanide-containing waste from its storage tank 9 is passed through cathode compartment 6 of the first electrodialysis unit A via lines $C_1$ and $C_2$, passed through anode compartment 5' of the second electrodialysis unit B via line $C_3$ and then recirculated to storage tank 9 via line $C_4$ and collected line $C_5$, whilst another part of cyanide-containing waste is passed in parallel through concentration compartments 8, 8 of the first electrodialysis unit A via lines $C_1$ and $C_6$, $C_6$, then passed through concentration compartments 8', 8' of the second electrodialysis unit B via lines $C_7$, $C_7$ and then recirculated to storage tank 9 via lines $C_8$, $C_8$ and collected line $C_5$. Simultaneously, a solution of alkali metal chloride or alkaline earth metal chloride from its storage tank 10 is passed in parallel through anode compartment 5 and dilution compartments 7, 7 of the first electrodialysis unit A via line $C_9$, passed through cathode compartments 6' and dilution compartments 7', 7' of the second electrodialysis unit B via lines $C_{10}$, $C_{10}$ and then recirculated to storage tank 10 via lines $C_{11}$ and collected line $C_{12}$.

The cyanide concentration at the concentration side can gradually be lowered by continuing this operation and at last, the cyanide can completely be removed. In practice, however, the operation is stopped when the concentration of the alkali metal chloride or alkaline earth metal chloride at the dilution side lowers to approximately several hundreds ppm or when, if a cyanide compound is contained at the dilution side, its concentration becomes nought or less than the critical value, and this is followed by the second operation. That is to say, when the concentration of the alkali metal chloride or alkaline earth metal chloride in the solution thereof at the dilution side becomes several hundreds ppm and the cyanide concentration becomes nought or less than the critical value, the solution of storage tank 10 is discharged and a new cyanide-containing waste is fed thereto. At this time, the cyanide-containing waste in storage tank 9 has a sufficiently low cyanide concentration and contains the alkali metal or alkaline earth metal chloride in a high concentration. In other words, storage tank 9 becomes substantially a storage tank for the solution of the alkali metal chloride or alkaline earth metal chloride, while storage tank 10 becomes a new storage tank for the cyanide-containing waste. When the signs of electrodes of the first electrodialysis unit and second electrodialysis unit are reversed at this time, 1 is converted into cathode, 2 into anode, 5 into cathode compartment, 6 into anode compartment, 7 into concentration compartment and 8 into dilution compartment, while similarly 1' is converted into anode, 2' into cathode, 5' into cathode compartment, 6' into anode compartment, 7' into concentration compartment and 8' into dilution compartment. The similar operation to the first operation can be conducted by circulating both the colutions in the similar manner to the first operation. Since a trace amount of cyanide compound remaining in the solution used as a solution of alkali metal chloride or alkaline earth metal chloride can completely be removed by electrodialysis in the dilution compartment, it is not always necessary that the cyanide concentration in the solution of the concentration side in the first operation be nought. Thus a cyanide-containing waste can effectively be treated by repeating these operations.

The features or advantages of the present invention are as follows:

1. Since a complex is dissociated in a cathode compartment to form readily decomposable free cyanide, its decomposition is completely accomplished.

2. The cyanide is decomposed into carbon dioxide and nitrogen by chlorine generated at anode.

3. The method of the invention is economical since most of the alkali metal chloride or alkaline earth metal chloride necessary for decomposition can be circulated and reused.

4. A trace amount of cyanide compound remaining at the dilution side is completely dialysed to the concentration side and the cyanide concentration becomes nought or less than the critical value at the discharge side.

5. The electrolytic decomposition of a cyanide compound is promoted by concentrating the cyanide compound in the concentration compartment.

6. The operation is very simple since the first cyanide-containing waste can be reused as a solution of alkali metal chloride or alkaline earth metal chloride in the dilution system by reversing the signs of electrodes of the first electrodialysis unit and the second electrodialysis unit.

The following examples are given in order to illustrate the invention in detail without limiting the same.

EXAMPLE 1

Using an alectrodialysis cell provided with ten cation exchange membranes and ten anion exchange membranes each having an effective area of 133 cm², a plus electrode near the anion exchange membrane and a minus electrode near the cation exchange membrane, piping was carried out as shown in FIG. 1.

Five solutions containing 200 ppm (as $CN^-$) of (1) $K_4[Fe(CN)_6]$, (2) $K_2[Ni(CN)_4]$, (3) $K_2[Cu(CN)_3]$, (4) NaCN and (5) $Na_4[Fe(CN)_6]$ were used as a raw solution to be treated.

First, 2,000 ml of the raw solution (1) was fed to storage tank 9 at the concentration side, 2,000 ml of a solution containing 2,000 ppm of sodium chloride was fed to storage tank 10 at the dilution side and then electrodialysis was carried out with circulating amounts of 1,000 ml/min both at the concentration side and at the dilution side at a voltage of 100 V. After the electrodialysis for 1 hour, the solution of storage tank 10 at the dilution side was all discharged and the solution of storage tank 9 was all removed into storage tank 10. Then 2,000 ml of the raw solution was newly fed to storage tank, followed by electrodialysis under the similar conditions to the first operation.

With respect to the above mentioned raw solutions (2), (3), (4) and (5) also, experiments were carried out by the similar procedures under the similar conditions to the case of the raw solution (1). The results are shown in Tables 1 to 5.

Table 1

Raw Solution (1) $K_4[Fe(CN)_6]$

1st Operation

|  |  | Solution at concentration side | Solution at dilution side |
|---|---|---|---|
| initial | NaCl | 0 ppm | 2000 ppm |
|  | CN⁻ | 200 ppm | 0 ppm |
| after 1 hr | NaCl | 1650 ppm | 300 ppm |
|  | CN⁻ | 42.8 ppm | 0 ppm |

2nd Operation

|  |  |  |  |
|---|---|---|---|
| initial | NaCl | 0 ppm | 1650 ppm |
|  | CN⁻ | 200 ppm | 42.8 ppm |
| after 1 hr | NaCl | 1300 ppm | 300 ppm |
|  | CN⁻ | 42.3 ppm | not found |

Table 2

Raw Solution (2) $K_2[Ni(CN)_4]$

1st Operation

|  |  | Solution at concentration side | Solution at dilution side |
|---|---|---|---|
| initial | NaCl | 0 ppm | 2000 ppm |
|  | CN⁻ | 200 ppm | 0 ppm |
| after 1 hr | NaCl | 1650 ppm | 300 ppm |
|  | CN⁻ | 47.8 ppm | 0 ppm |

2nd Operation

|  |  |  |  |
|---|---|---|---|
| initial | NaCl | 0 ppm | 1650 ppm |
|  | CN⁻ | 200 ppm | 47.8 ppm |
| after 1 hr | NaCl | 1300 ppm | 300 ppm |
|  | CN⁻ | 48.9 ppm | not found |

Table 3

Raw Solution (3) $K_2[Cu(CN)_3]$

1st Operation

|  |  | Solution at concentration side | Solution at dilution side |
|---|---|---|---|
| initial | NaCl | 0 ppm | 2000 ppm |
|  | CN⁻ | 200 ppm | 0 ppm |
| after 1 hr | NaCl | 1600 ppm | 300 ppm |
|  | CN⁻ | 20.6 ppm | 0 ppm |

2nd Operation

|  |  |  |  |
|---|---|---|---|
| initial | NaCl | 0 ppm | 1600 ppm |
|  | CN⁻ | 200 ppm | 20.6 ppm |
| after 1 hr | NaCl | 1300 ppm | 250 ppm |
|  | CN⁻ | 22.2 ppm | not found |

Table 4

Raw Solution (4) NaCN

1st Operation

|  |  | Solution at concentration side | Solution at dilution side |
|---|---|---|---|
| initial | NaCl | 0 ppm | 2000 ppm |

Table 4-Continued

Raw Solution (4) NaCN

1st Operation

|  |  | Solution at concentration side | Solution at dilution side |
|---|---|---|---|
|  | CN⁻ | 200 ppm | 0 ppm |
| after 1 hr | NaCl | 1700 ppm | 300 ppm |
|  | CN⁻ | 15.0 ppm | 0 ppm |

2nd Operation

|  |  |  |  |
|---|---|---|---|
| initial | NaCl | 0 ppm | 1700 ppm |
|  | CN⁻ | 200 ppm | 15.0 ppm |
| after 1 hr | NaCl | 1400 ppm | 300 ppm |
|  | CN⁻ | 15.5 ppm | not found |

Table 5

Raw Solution (5) $Na_4[Fe(CN)_6]$

1st Operation

|  |  | Solution at concentration side | Solution at dilution side |
|---|---|---|---|
| initial | NaCl | 0 ppm | 2000 ppm |
|  | CN⁻ | 200 ppm | 0 ppm |
| after 1 hr | NaCl | 1650 ppm | 300 ppm |
|  | CN⁻ | 43.4 ppm | 0 ppm |

2nd Operation

|  |  |  |  |
|---|---|---|---|
| initial | NaCl | 0 ppm | 1650 ppm |
|  | CN⁻ | 200 ppm | 43.4 ppm |
| after 1 hr | NaCl | 1400 ppm | 300 ppm |
|  | CN⁻ | 44.5 ppm | not found |

EXAMPLE 2

Using the same apparatus as that of Example 1, a solution containing 200 ppm as CN⁻ of $Na_4[Fe(CN)_6]$ and solution containing 1,000 ppm of NaCl were used respectively as a raw solution to be treated. In the first operation, each 2,000 ml of the raw solutions were fed to storage tanks 9 and 10 and then subjected to electrodialysis by the similar procedures under the similar conditions to Example 1. The results are shown in Table 6.

Table 6

| Raw Solutions | $Na_4[Fe(CN)_6]$ | 200 ppm |
|---|---|---|
|  | NaCl | 1000 ppm |

1st Operation

|  |  | Solution of concentration side | solution at dilution side |
|---|---|---|---|
| initial | NaCl | 1000 ppm | 1000 ppm |
|  | CN⁻ | 200 ppm | 200 ppm |
| after 1 hr | NaCl | 1850 ppm | 100 ppm |
|  | CN⁻ | 74.3 ppm | 0.43 ppm |

2nd Operation

|  |  |  |  |
|---|---|---|---|
| initial | NaCl | 0 ppm | 1850 ppm |
|  | CN⁻ | 200 ppm | 74.3 ppm |
| after 1 hr | NaCl | 48.7 ppm | 150 ppm |
|  | CN⁻ | 1650 ppm | not found |

EXAMPLE 3

Using the same apparatus as that of Example 1, a solution containing 10,000 ppm as CN⁻ of $K_2[Ni(CN)_4]$ was treated as a raw solution. In the first operation, 2,000 ml of the raw solution was fed to storage tank 9, 2,000 ml of a 5 percent solution of sodium chloride was fed to storage tank 10 and then subjected to electrodialysis under the same conditions to Example 1. After the electrolysis for 3 hours, all the solution of storage tank 10 was discharged, the solution of storage tank 9 was removed into storage tank 10 and 2,000 ml of the raw solution was newly fed to storage tank 9, followed by electrodialysis under the similar conditions to the first operation. The results are shown in Table 7.

Table 7

Raw Solution $K_2[Ni(CN)_4]$

| 1st Operation | | Solution at concentration side | Solution at dilution side |
|---|---|---|---|
| initial | NaCl | 0 ppm | 50000 ppm |
|  | $CN^-$ | 10000 ppm | 0 ppm |
| after 3 hrs | NaCl | 49000 ppm | 950 ppm |
|  | $CN^-$ | 195 ppm | 0 ppm |
| 2nd Operation | | | |
| initial | NaCl | 0 ppm | 49000 ppm |
|  | $CN^-$ | 10000 ppm | 195 ppm |
| after 3 hrs | NaCl | 48000 ppm 960 ppm | |
|  | $Cn^-$ | 198 ppm | not found |

EXAMPLE 4

Using a first electrodialysis unit A provided with six anion exchange membranes and five cation exchange membranes each having an effective area of 133 cm² and a second electrodialysis unit B provided with six similar cation exchange membranes and five similar anion exchange membranes, piping was carried out as shown in FIG. 2.

Electrodes 2 and 1' were used as cathodes and electrodes 1 and 2' were used as anodes. 2,000 ml of a raw solution containing 200 ppm as $CN^-$ of $K_4[Fe(CN)_6]$ was fed to storage tank 9, 2,000 ml of a solution containing 2,000 ppm of sodium chloride was fed to storage tank 10 and then subjected to electrodialysis with a circulating liquid quantity of 600 ml/min at a voltage of 50 V in each of the first and second electrodialysis units. After the electrodialysis for 1 hour, all the solution of storage tank 10 was discharged, 2,000 ml of the raw solution was fed to storage tank 10 and electrodes 1 and 2' were converted into cathodes while electrodes 2 and 1' were converted into anodes, followed by the second electrodialysis. The results are shown in Table 8.

Table 8

Raw Solution $K_4[Fe(CN)_6]$

| 1st Operation | | Solution at concentration side | Solution at dilution side |
|---|---|---|---|
| initial | NaCl | 0 ppm | 2000 ppm |
|  | $CN^-$ | 200 ppm | 0 ppm |
| after 1 hr | NaCl | 1680 ppm | 280 ppm |
|  | $CN^-$ | 42.0 ppm | 0 ppm |
| 2nd Operation | | | |
| initial | NaCl | 0 ppm | 1680 ppm |
|  | $CN^-$ | 200 ppm | 42.0 ppm |
| after 1 hr | NaCl | 1330 ppm | 270 ppm |
|  | $CN^-$ | 42.5 ppm | 0 ppm |

What is claimed is:

1. A method for the treatment of cyanide-containing wastes, which comprises passing a part of cyanide-containing waste from a cyanide-containing waste storage tank in series through a cathode compartment composed of a cathode and cation exchange membrane and an anode compartment composed of an anode and anion exchange membrane and then recirculating to the cyanide-containing waste storage tank, simultaneously passing the other part of cyanide-containing waste in parallel through a plurality of concentration compartments partitioned by a plurality of anion exchange membranes and cation exchange membranes arranged alternately and then recirculating to the cyanide-containing waste storage tank, and simultaneously passing a solution of an alkali metal chloride or alkaline earth metal chloride from an alkali metal chloride or alkaline earth metal chloride solution storage tank in parallel through a plurality of dilution compartments partitioned by a plurality of anion exchange membranes and cation exchange membranes arranged alternately and then recirculating to the alkali metal chloride or alkaline earth metal chloride solution storage tank.

2. A method for the treatment of cyanide-containing wastes, which comprises passing a part of cyanide-containing waste from a cyanide-containing waste storage tank in series through a cathode compartment composed of a cathode and cation exchange membrane and an anode compartment composed of an anode and anion exchange membrane, said cathode compartment and anode compartment being situated in one electrodialysis cell, and then recirculating to the cyanide-containing waste storage tank, simultaneously passing the other part of cyanide-containing waste in parallel through a plurality of concentration compartments partitioned by a plurality of anion exchange membranes and cation exchange membranes arranged alternately between said cathode and anode and then recirculating to the cyanide-containing waste storage tank, and simultaneously passing a solution of an alkali metal chloride or alkaline earth metal chloride from an alkali metal chloride or alkaline earth metal chloride solution storage tank in parallel through a plurality of dilution compartments partitioned by a plurality of anion exchange membranes and cation exchange membranes arranged alternately between said cathode and anode and then recirculating to the alkali metal chloride or alkaline earth metal chloride solution storage tank.

3. A method for the treatment of cyanide-containing wastes, which comprises passing a part of cyanide-containing waste from a cyanide-containing waste storage tank in series through a cathode compartment of a first electrodialysis unit and an anode compartment of a second electrodialysis unit and then recirculating to the cyanide-containing waste storage tank, simultaneously passing the other part of cyanide-containing waste in parallel through concentration compartments of the first electrodialysis unit and then in parallel through concentration compartments of the second electrodialysis unit and then recirculating to the cyanide-containing waste storage tank, and simultaneously passing a solution of an alkali metal chloride or alkaline earth metal chloride from an alkali metal chloride or alkaline earth metal chloride solution storage tank in parallel through dilution compartments of the first electrodialysis unit and then in parallel through dilution compartments of the second electrodialysis unit and then recirculating to the alkali metal chloride or alkaline earth metal chloride solution storage tank, each of said electrodialysis units having a cathode compartment composed of a cathode and cation exchange membrane, anode compartment composed of an anode and anion exchange membrane, and dilution compartments and concentration compartments arranged alternately between the cathode compartment and anode compartment and partitioned alternately by a plurality of anion exchange membranes and cation exchange membranes.

4. The method of claim 2, wherein the cyanide-containing waste treated in the former operation is reused as the solution of an alkali metal chloride or alkaline earth metal chloride.

5. The method of claim 3, wherein the cyanide-containing waste treated in the former operation is reused as the solution of an alkali metal chloride or alkaline earth metal chloride.

6. The method of claim 1, wherein said cyanide-containing waste contains at least one of $K_4[Fe(CN))_6]$, $K_2[Ni(CN)_4]$, $K_2[Cu(CN)_3]$, NaCN and $Na_4[Fe(CN)_6]$.

7. The method of claim 1, wherein said alkali metal chloride is sodium chloride.

* * * * *